United States Patent
Alouini et al.

(10) Patent No.: US 6,304,593 B1
(45) Date of Patent: Oct. 16, 2001

(54) ADAPTIVE MODULATION SCHEME WITH SIMULTANEOUS VOICE AND DATA TRANSMISSION

(75) Inventors: Mohamed-Slim Alouini, Minneapolis, MN (US); Xiaoyi Tang; Andrea Goldsmith, both of Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 09/167,406

(22) Filed: Oct. 6, 1998

Related U.S. Application Data

(60) Provisional application No. 60/061,122, filed on Oct. 6, 1997.

(51) Int. Cl.[7] .................................................. H04L 25/00
(52) U.S. Cl. ............................................. 375/216; 375/279
(58) Field of Search ..................................... 375/216, 222, 375/377, 268, 300, 295, 279, 280; 455/522, 69; 332/149; 370/462, 468, 444

(56) References Cited

U.S. PATENT DOCUMENTS

| | | | |
|---|---|---|---|
| 4,833,706 | * 5/1989 | Hughes-Hartogs | 370/260 |
| 5,054,034 | * 10/1991 | Hughes-Hartogs | 375/222 |
| 5,535,238 | * 7/1996 | Schilling et al. | 375/130 |
| 5,745,480 | * 4/1998 | Behtash et al. | 370/252 |
| 5,878,329 | * 3/1999 | Mallinckrodt | 455/69 |
| 6,061,392 | * 5/2000 | Bremer et al. | 375/222 |
| 6,128,348 | * 10/2000 | Kao et al. | 375/260 |

OTHER PUBLICATIONS

Qiang Shen et al., "Power Assignment in CDMA Personal Communication Systems with Integrated Voice/Data Traffic," IEEE Tran. on Com., pp 168–172, 1996.*
Joom Bae Kim et al., "Resource Allocation for Multiple Classes of DS–CDMA Traffic," IEEE, Tran. on Vehicular Tech. vol. 49, No. 2, pp 506–519, Mar. 2000.*
Insoo Koo et al., "Capacity–Optimized Power Allocation Scheme in an Integrated Voice and data DS–CDMA System, "IEEE Tencon, pp 1178–1181, 1999.*
Mohamed–Slim et al., "An Adaptive Moduaition Scheme for Simultaneous Voice and Data Transmission over Fading Channels," IEEE, pp 939–943, 1998.*

* cited by examiner

*Primary Examiner*—Tesfaldet Bocure
(74) *Attorney, Agent, or Firm*—Fish & Richardson P.C.

(57) ABSTRACT

An adaptive modulation scheme for two streams of information that have different characteristics; preferably voice and data. The voice and data are transmitted on two quadrature channels, the I and Q channels. The amount of power in the channels is adaptively varied. The voice is given all the power it needs for reliable communication over a binary phase shift keying system. The data can have higher data rates, using an M-ary amplitude modulation scheme. The data uses whatever variable amount of power is left after transmitting the voice. The data rate is changed by changing the constellation size, so that a higher bit rate is transmitted, but requiring higher power.

18 Claims, 4 Drawing Sheets

ADAPTIVE MODULATION SCHEME WITH SIMULTANEOUS VOICE AND DATA TRANSMISSION

CROSS REFERENCE TO RELATED APPLICATIONS

This application claims the benefit of the U.S. Provisional Application No. 60/061,122, filed on Oct. 6, 1997, which is incorporated herein by reference.

STATEMENT AS TO FEDERALLY SPONSORED RESEARCH

The U.S. Government may have certain rights in this subject matter pursuant to Grant No. NAV-5X-N149510861 awarded by the United States Navy.

FIELD OF THE INVENTION

The present disclosure describes an adaptive modulation technique optimized for simultaneous voice and data transmission over fading channels. More specifically, the present scheme describes systems which are optimized to maximize spectral efficiency between the voice and the data.

BACKGROUND

Modern communication channels need to carry various information including both voice and data. The data services typically include facsimile, e-mail, Internet access as well as other forms of data communication services. However, the bandwidth of the wireless spectrum is a limiting factor on the amount of information that can be transmitted. This makes it extremely important to maintain spectral efficiency.

Noise problems in wireless communication channels also cause various problems which limit the amount of information through these channels. Multipath causes the amplitude of the received channel to change. For a fixed noise at the receiver, multipath effects will actually change the signal to noise ratio/carrier to noise ratio.

Various techniques have been used to maximize the spectral efficiency of communications. Certain transmission techniques take advantage of the time-varying nature of wireless channels to vary the transmitted power level, symbol rate, coding rate and scheme and constellation size. These techniques are described in T. Ue, S. Sampei, and N. Morinaga, "Symbol rate and modulation level controlled adaptive modulation/TDMA/TDD for personal communication systems," in *Proc. IEEE Veh. Technol. Conf. VTC'95*, Chicago, Ill., pp. 306–310, July 1995. Full paper published in the *IEICE Trans. Commun.*, vol. E78-B, pp. 1117–1124, August 1995; W. T. Webb and R. Steele, "Variable rate QAM for mobile radio," *IEEE Trans. on Commun.*, vol. COM-43, pp. 2223–2230, July 1995; S. G. Chua and A. Goldsmith, "Variable-rate variable-power M-QAM for fading channels," in *Proc. IEEE Veh. Technol. Conf. VTC'96*, Atlanta, Ga., pp. 815–819, April 1996. Full paper to appear in the *IEEE Trans. on Commun.*, October 1997; H. Matsuoka, S. Sampei, N. Morinaga, and Y. Kamio, "Adaptive modulation system with variable coding rate concatenated code for high quality multi-media communication systems," in *Proc. IEEE Veh. Technol. Conf. VTC'96*, Atlanta, GA, pp. 487–491, April 1996. Full paper published in the *IEICE Trans. Commun.*, vol. E79-B, pp. 328–334, March 1996; M. S. Alouini and A. Goldsmith, "Adaptive M-QAM modulation over Nakagami fading channels," in To appear in *Proc. IEEE Global Commun. Conf. GLOBECOM'97*, Phoenix, Ariz., November 1997. None of these techniques use adaptive techniques of the type described in this application.

The goal of many of these techniques is to improve the average spectral efficiency. The spectral efficiency is often defined as the average transmitted data rate per unit bandwidth for an average specified carrier to noise ratio and bit error rate. Hence, there is often a trade-off between the noise on the channel and the amount of information which can be transmitted over the channel.

Moreover, accurate performance can be enhanced by accurate channel estimation at the receiver, and a reliable feedback path between that estimator and the transmitter. Such systems may also require buffering of the input data since assumption of a low carrier to noise ratio can cause a very high outage probability.

SUMMARY

The present inventors have recognized that certain characteristics of the channels and the information passing through the channels can be used to improve performance and hence the data rate of the output. In general, voice transmission has a low rate requirement. However, voice transmission is very sensitive to real-time delays. A real-time delay will be heard by the user at the other end. However, voice is more tolerable to bit errors. In contrast, data transmission demands higher rates with fewer errors (smaller bit error rate), but has less stringent delay requirements. More information is necessary and fewer errors can be tolerated. However, the actual time when the information arrives can be much more flexible.

The present system, in recognition of the above, uses fixed rate transmission for the voice, combined with power adaption for the data. The transmitter adjusts its power to maintain a relatively constant carrier-to-noise ratio at the receiver. This makes the system well suited to voice. A bursty variable-rate transmission which maximizes average spectral efficiency is used for data communication.

The present scheme preferably uses two independent information streams which are inherently different not only in their nature but also in their delay sensitivity and bit error rate sensitivity.

Another aspect of this system allows changing the rate of the data based on the capacity of the channel. This is done by changing the size of the signal constellation. The binary signal is Gray coded into an analog signal whose amplitude represents the bits. The number of bits represented by each sample of the signal is adaptively varied, according to the signal to noise ratio.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

The preferred embodiment system described herein uses a generalized and adaptive version of the well-known unbalanced quadrature phase shift keying as well known in the art. This general modulation scheme is used for IS-95 communications, and is also described in M. K. Simon's "Error Probability Performance of Unbalanced QPSK Receivers", IEEE transactions on Communications Volume COM-26 page 1390–1397, September 1978. This system allows handling two different types of data on its two different orthogonally-modulated channels. Specifically, the in-phase channel or "I" channel follows a separate path from the quadrature or "Q" channel.

While it is known to communicate different information on the I and Q channel, the present system optimizes the usability by embedding data communication on one channel and voice on the other channel. The preferred mode transmits the data on the I channel and the voice on the Q channel. The preferred mode provides priority to the voice communication. During poor channel conditions, most of the transmitted power will be allocated to ensure satisfactory transmission of speech. Excess power increases as the channel quality increases. That extra power is allocated to data. In the most preferred mode, binary phase shift keying is used for voice communication, and M-ary amplitude modulation is used for data.

Figure 1:
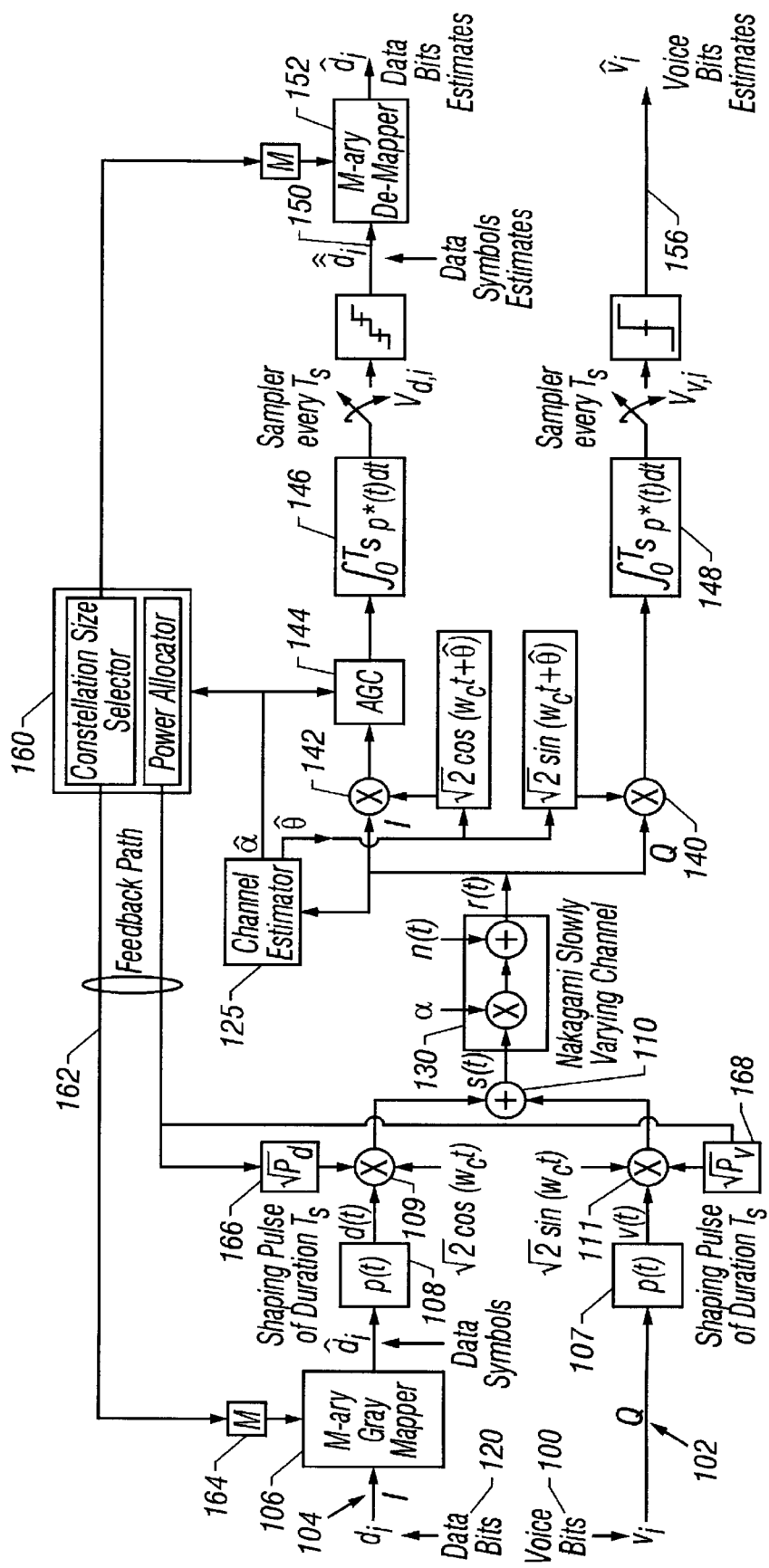
FIG. 1 shows a block diagram of the system.

FIG. 1 shows a block diagram of the overall system. Voice is digitized in any of a number of well known ways, to form voice bits, $v_i$ 100. Similarly, the data is digital, forming data bits, $d_i$ 120. The voice is applied to the Q channel 102 while the data is applied to the I channel 104. The system as disclosed herein uses a hybrid binary phase shift keying/M-ary amplitude modulation scheme.

The overall transmitted signal takes the following form $$s(t)=\sqrt{2}[\sqrt{P_d}d(t)\cos(\omega_c t)-\sqrt{P_v}v(t)s\sin(\omega_c t)],$$

where $\omega_c$ is the radian carrier frequency, $P_d$ is the power of the in-phase channel (data power), and $P_v$ is the power on the Q or voice channel. D(t) corresponds to the data symbol stream and v(t) corresponds to the voice symbol stream. Specifically, $$d(t) = \sum_{i=-\infty}^{\infty} d_i p(t - iT_s)$$

$$v(t) = \sum_{i=-\infty}^{\infty} v_i p(t - iT_s),$$

here p(t) is a unit power shaping pulse of duration $T_s$ formed by pulse shapers 107, 108 and $\tilde{d}_I$ are the Gray-mapped data symbols of the data bits $\{d_i\}$ as mapped by Gray mapper 106 described further herein. The I channel is formed by mixing $\sqrt{2}\cos\omega_c t$ with the signal in mixer 109. Similarly, the Q channel is formed by mixer 111, receiving $\sqrt{2}\sin\omega_c t$. The I and Q data streams are combined by combiner 110 and pass through the channel 130.

The channel induces effects on the signal. Multipath effect includes a multiplicative fading gain $\alpha$ and a phase shift $\theta$. additive white noise n(t) can also be induced on the signal. When transmitted, signal s(t) is received after passage through the channel 130, the receive signal r(t) can be written as $$r(t)=\sqrt{2}\alpha[\sqrt{P_d}d(t)\cos(w_c t+\theta)-\sqrt{P_v}v(t)\sin(\omega_c t+\theta)]+n(t).$$

The receive signal is coherently demodulated in demodulators 140 and 142. These demodulators assume perfect channel estimation, i.e. $\hat{\theta}=\theta$ and $\hat{\alpha}=\alpha$.

The I signal representing data is more sensitive to certain inconsistencies. Hence, the I signal is passed through an adaptive gain controller 144 which is controlled according to the $\hat{\alpha}$ fading gain estimate from the channel estimator 125. Then, both the I and Q signals are passed through respective matched filters 146, 148.

The outputs of the matched filters are sampled every $T_s$ time frame to form a decision variable. The I data bits form a decision variable $V_{d,i}$, while the Q bits form a decision variable $V_{v,i}$. The decision variables can be expressed as $$V_{d,i} = \alpha\sqrt{P_d}\,d_i + N_I,$$

$$V_{v,i} = \alpha\sqrt{P_v}\,V_I + N_Q,$$

Note that $N_i$ and $N_q$ are independent, zero mean Gaussian noise samples. Both have the same variance $N_0 T_s/2$. This forms respective estimates of the data and voice symbols.

The data symbol 104 has been Gray-mapped by Gray-mapper 106. Hence, the data symbol estimate 150 needs to be Gray demapped by demapper 152 to get the source data bits. The output 154 represents an estimate of the data bits $\hat{d}_1$.

Similarly, the output 156 represents an estimate of the voice bits. The system uses a pilot tone to continually send a known channel-sounding technique. This enables channel-induced envelope fluctuation $\hat{\alpha}$ to be extracted at the channel estimation stage.

Channel fading estimation can be carried out using known systems, including transparent tone in band, or pilot symbol assisted modulation. These systems are described in the textbook W. T. Webb and L. Hanzo "Modern Quadrature Amplitude Modulation", New York, N.Y. IEEE Press 1994 and are well known.

The channel is defined to have a peak power constraint of P. A variable power binary phase shift keying modulation is used on the Q channel to maintain a power $P_b(\hat{\alpha})<P$. This ensures continuous fixed rate voice transmission at the target voice bit error rate, which we call $BER_{v0}$. In this scheme, the power allocated to voice $P_v(\hat{\alpha})$ is set to just meet the $BER_{v0}$ requirement. The remaining power available is the power for the data—$P_d(\hat{\alpha})=P-P_v(\hat{\alpha})$. This power is dynamically assigned to the I channel in order to support an adaptive M-ary pulse amplitude modulation which operates below the target data bit error rate $BER_{d0}$. Non-adaptive pulse amplitude modulation is described in M. K. Simon, et al., Digital Communication Techniques—Signal Design and Detection, Englewood Cliffs, N.J. PTR Prentice Hall, 1995, page 219.

The channel carrier to noise ratio estimate and the available power $P_d(\gamma)$ (where $\gamma=\hat{\alpha}$) defines the signal constellation size N to be transmitted. The decision device 160 uses this information to allocate the constellation size and the power and informs the transmitter of that decision via feedback path 162. The feedback path hence controls the constellation size $M_n$ of the Gray Mapper 106 via M control 164. It also controls the respective powers of the I and Q channels via power controls 166, 168.

The power allocator must follow certain rules. First, voice transmission cannot be attempted when the power required to transmit the voice $P_v(\gamma)$ to meet the target voice bit error rate exceeds the peak power constraint P. This causes declaration of a voice outage. Hence, the voice power is expressed as follows $$P_v(\gamma) = \left\{\frac{\gamma_{vI}}{\gamma}P\;\;P_v(\gamma)\le P(\text{ V equivalently }\gamma\le\gamma_{vI}\right),$$

where $\gamma_{v1}=[\text{erfc}^{-1}(2BER_{v0})]^2$ and $\text{erfc}^{-1}(\cdot)$ denotes the inverse complementary error function.

Since the power needed for voice is fixed, the remaining power is left for data. The scheme responds to instantaneous channel carrier to noise ratio fluctuation by varying its constellation size M. The data carrier to noise ratio is divided into n+1 fading regions. The constellation size is set to $M_n=2^n$ where n is the number of bits of the symbol.

The carrier to noise ratio of the receive data is estimated. When the receive carrier to noise ratio is estimated to be in the nth region, the constellation size $M_n$ is transmitted. Hence, the region boundaries or switching thresholds are set as follows $$\gamma d_n = \frac{1-2^{2n}}{3} \ln(10 \; BER_{d0}); \text{ (equivalently } \gamma \geq \gamma_{vI} + \gamma_{dI}))$$

$$\gamma d_n + 1 \quad +\infty$$

If voice is being simultaneously transmitted with data, and the remaining power is not sufficient to perform binary phase shift keying on the I channel, then no data is transmitted, and a data outage is declared. Hence, the power allocated to data transmission can be expressed as follows $$P_d(\gamma) = \begin{cases} \left(1 - \frac{vI}{\gamma}\right)P & \gamma \geq \gamma d_1 \text{(equivalently } \gamma \geq (\gamma_{vI} + \gamma d_1), \\ 0 & \text{otherwise} \end{cases}$$

Figure 2:
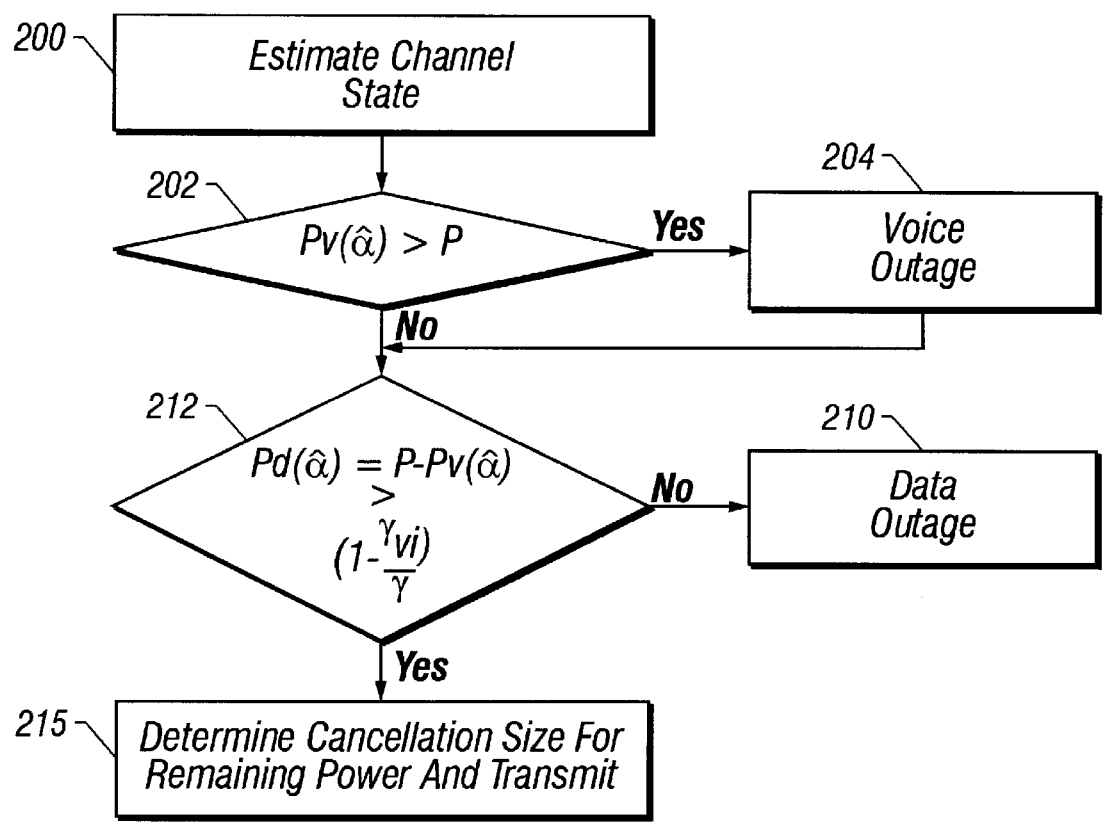
FIG. 2 shows a flowchart of the power allocation system.

Summarizing the above with reference to the flowchart of FIG. 2, step 200 represents estimating the channel state. This is done by channel estimator 125. At step 202, using the estimated channel state, a determination is made of whether the power required for voice is greater than the peak power constraint of the channel. If so, a voice outage is declared at step 204. If not, voice is transmitted, and a determination is made of whether $P_d$, the power remaining for data, which is equal to the total peak power P minus the voice power $P_{v\gamma}$ of the ($\hat{\alpha}$), is enough to support binary phase shift keying at 212. If $P_d$ is sufficient to support binary phase shift keying according to the equations above, then the constellation size related to the specific amount of power is obtained, and the data is transmitted. If $P_d$ is not sufficient, then a data outage is declared at step 210. If it is sufficient, then data is transmitted at 220.

All of the decisions and techniques described above are well known in the art and can be implemented in a digital signal processor by programming the flowchart above. Alternatively, this can be implemented in a field programmable gate array or in regular logic using hardware definition language (HDL). Alternatively, the operation can be carried out in a processor or microcontroller.

Gray mapping and demapping is well known in the art. Briefly, Gray mapping is often a good way to encode a signal, since noise on the signal will typically only cause a signal bit error. The system as preferred uses a multiple level modem ranging from 2–8 levels. This can support from 1–256 PAM modulation for the data transmission and reverse transmission.

Figure 3:
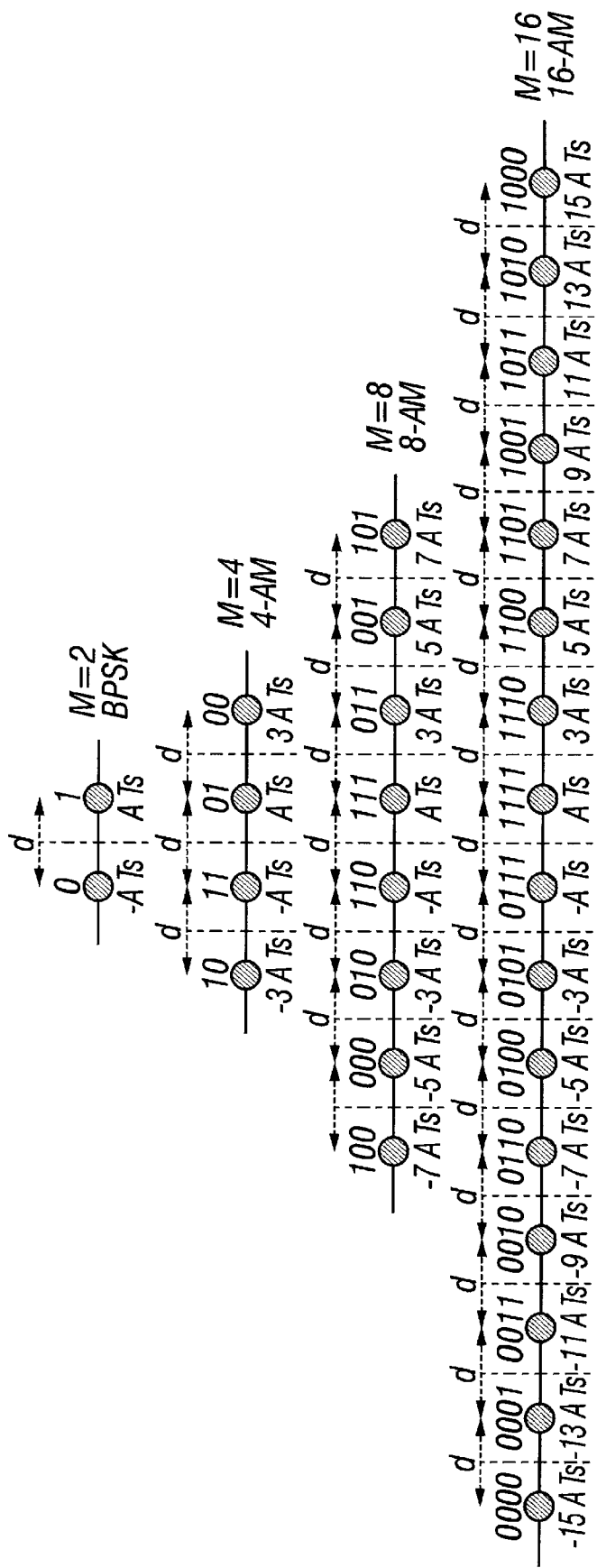
FIG. 3 shows the Gray mapping for the different M values.

The Gray coding for the bit mapping on this system and for different M size systems is shown in FIG. 3. An important feature of this system is keeping distance between codes constant for all different powers/carrier to noise ratio of the channel. The system described above determines the maximum constellation size M for the variable power that remains after the effective amount of power is allocated to the voice. Then, that M is used, with constant distances being used for all values of M.

FIG. 3 shows binary phase shift keying, (M=2), used for transmission of voice. Note also the distance of 2ATs between the two symbols.

The M=4, 8 and 16 cases, shown in the following lines, each keep 2AT between symbols. The power to transmit M=16 is of course greater than the power to transmit the lower M signals. However, more data is contained in each sample. Hence, the variation of M changes the power and the necessary power over the channel.

As discussed above, the M value is adaptively changed to change the constellation size in response to power fluctuation.

Figure 4:
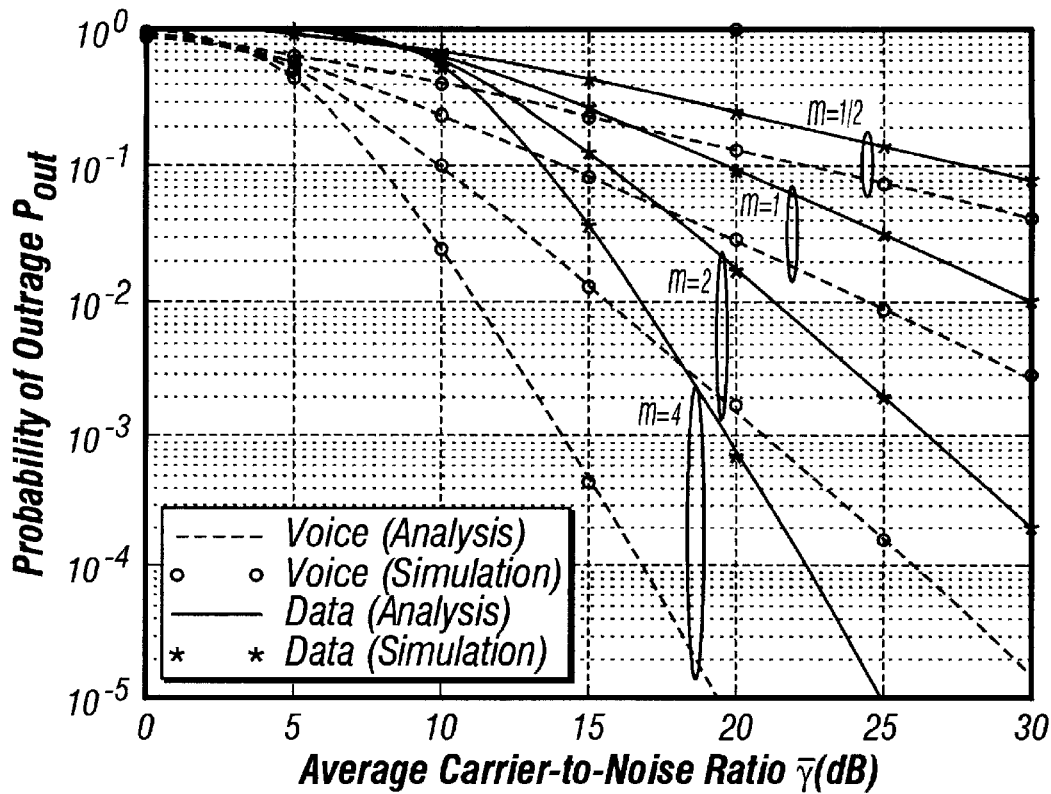
FIG. 4 shows outage probability.
Figure 5:
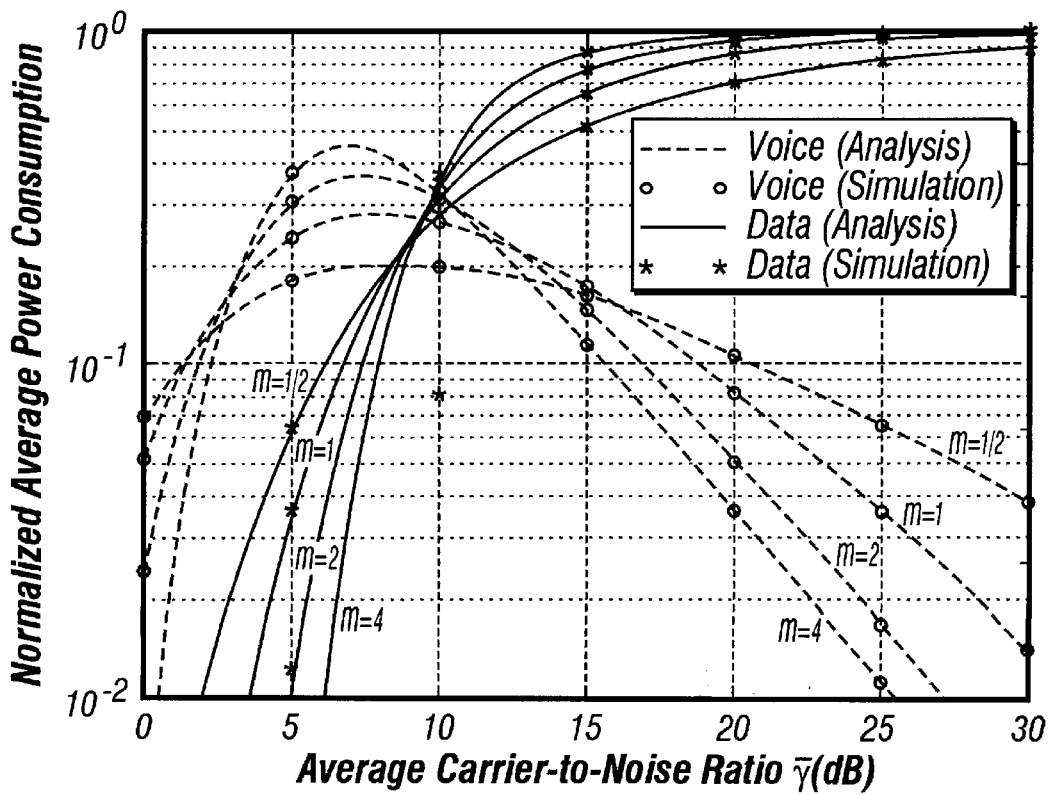
FIG. 5 shows average power allocation.

Results of numerical simulations are shown in the attached. FIG. 4 shows the outage probabilities for voice and data transmission. This was done using both numerical analysis and simulation for different carrier to noise ratio systems. Note that probability of outage for all cases is less for voice than for data. FIG. 5 shows average power allocation using this system: where the dashed lines show average power allocation for voice transmission and in solid lines the normalized average power allocation for data transmission. At low $\gamma$ both voice and data have a higher outage probability. However, since during the times of outages, no data is transmitted, the power consumptions are relatively low.

The system as disclosed herein uses Gray coding for the data. FIG. 1 shows the preferred Gray-coded symbols with the lowest part of the figure for M=16. The 4 symbols are symmetrically distributed about zero with equal distance between adjacent symbols. A represents the amplitude level $T_s$ and the symbol duration D is 2 $At_s$. This provides a channel with noise power spectral density of $N_0$ and noise normally distributed with zero mean and definable variance.

Considering any specific fit, but specifically the leftmost bit of the 4 AM symbol. A bit error will occur when the bit as corrupted by noise falls into the boundary of bit zero. For instance, the left most bit of the symbol 1 will be interpreted as zero when the noise is larger than 3d/2. Hence, the probability of error Q is given by the following equation where Q is the Gaussian Q function.

$$Q(z) = \frac{1}{2} erfc\left(\frac{z}{\sqrt{2}}\right)$$

This enables determination of all of the varying characteristic of the symbol.

Although only a few embodiments have been described in detail above, other embodiments are contemplated by the inventor and are intended to be encompassed within the following claims. In addition, other modifications are contemplated and are also intended to be covered. For example, the independent data streams could be other than voice and data; any data that has different sensitivity to delay and carrier to noise ratio could be used.

What is claimed is:

1. A system for adaptively modulating voice and data on a channel, comprising:
   a first voice channel, modulated according to a first characteristic;
   a second data channel, maintained separate from said first voice channel and having characteristics which are modulated according to a second characteristic different than the first characteristic; and
   an allocator, operating to determine a power required by voice transmission, to determine if enough power exists to transmit voice reliably over said channel and if not declaring a voice outage, and if enough power exists to transmit voice, then transmitting said voice using said enough power and determining if enough power exists to transmit data reliably over said channel, and if enough power exists to transmit data then using whatever power is left after said transmitting said voice to transmit said data at a variable rate which is determined by the amount of power that exists.

2. A system as in claim 1 wherein first and second data channels are modulated in quadrature relative to one another.

3. A method of transmitting voice and data over a channel with a varying signal to noise ratio, comprising:

forming a first stream representing voice information and a second stream representing data information;

determining a maximum power available for transmission over the channel;

determining a variable amount of power which will be needed to transmit voice without causing delay in a received voice signal, and allocating that amount of power to transmission of voice;

determining an amount of power left by subtracting said voice power from said total power and allocating that amount of power to data transmission; and separately encoding said voice and data using different encoding systems, and transmitting said voice and data over the channel.

4. A system as in claim 3 wherein said voice is transmitted using binary phase shift keying, and said data is transmitted using adaptive M-ary amplitude modulation.

5. A system as in claim 3 wherein voice is transmitted using a first modulation phase and data is transmitted using a second modulation phase which is in quadrature relative to said first modulation phase.

6. A system as in claim 5 further comprising estimating an amount of noise in the channel, and determining said powers based on said noise estimate.

7. A method of transmitting voice and data over a single channel, comprising:

forming two independent information streams, each of which is different in its bit error sensitivity and delay characteristics;

determining a total amount of power which can be transmitted;

assigning a first kind of information to one of said data streams which has a better delay characteristic and assigning a second kind of information to the other of the information streams which has a better bit error sensitivity characteristic and more tolerance to delay;

determining a power which will be necessary to transmit said first kind of information without delay and using that amount of power to transmit the first kind of information and using a remainder of the power, which is a variable amount, to transmit the second kind of information; and combining said streams and transmitting said streams over a channel.

8. A method as in claim 7 further comprising determining an estimate of channel signal to noise ratio; and dynamically assigning amounts of said powers depending on said channel signal to noise estimate.

9. A method as in claim 8 wherein said second information is data, and a power of transmitted data is changed by changing a constellation size representing a total number of available states to represent the data.

10. A method as in claim 9 wherein said constellation size is changed by changing a number of bits in the data symbol.

11. A method of adaptively transmitting both voice and data over a channel that has a varying signal to noise ratio, comprising:

estimating a signal to noise ration of the channel;

determining an amount of power which will be necessary to transmit a first kind of information, that is sensitive to delays in reception, over said channel without interruption or delay;

determining if a total available power that can be transmitted over the channel is sufficient to allow said first kind of information to be transmitted;

transmitting said first kind of information if the power is sufficient; and using remaining variable amount of power to transmit a second kind of information that is less sensitive to said interruption or delay.

12. A method as in claim 11 further comprising determining if an amount of power left after said first kind of information is transmitted is sufficient to allow transmitting data, and establishing an outage if not, transmitting said second kind of information if so at a variable rate commensurate with a signal to noise ratio of the channel.

13. A method as in claim 11 wherein said first kind of information is voice, and said second kind of information is data.

14. A method as in claim 13 further comprising changing an amount of data power which is used by changing a constellation size of the data.

15. A method as in claim 14 wherein said changing a constellation size comprises changing a number of bits of the data symbol.

16. A method as in claim 13 further comprising establishing a voice outage when the power necessary to transmit voice is greater than a total available power for the channel.

17. A method of adaptively transmitting voice and data over a channel, comprising:

obtaining a voice stream and a data stream;

modulating said voice stream in a separate way from said data stream and adaptively separately controlling the powers of said voice stream and said data stream, said adaptively controlling being carried out in such a way that a probability of outage for voice is in all cases less than a probability of outage for data; and wherein said adaptively controlling comprises first determining an amount of power which will be necessary to reliably transmit voice, and transmitting said voice with said amount of power, while transmitting data only with whatever variable power is left, whether or not that is sufficient for reliable transmission of data.

18. A method as in claim 17 wherein said transmitting of data comprises Gray coding the data using a constellation size and adaptively varying said constellation size depending on an available power and channel characteristic.

* * * * *